Jan. 23, 1962  J. A. ACKERMANN  3,018,011
INDUSTRIAL TRUCK
Filed Aug. 29, 1957 4 Sheets-Sheet 1

INVENTOR.
JOSEPH A. ACKERMANN
BY Golrick & Golrick
Atty's.

Jan. 23, 1962 J. A. ACKERMANN 3,018,011
INDUSTRIAL TRUCK
Filed Aug. 29, 1957 4 Sheets-Sheet 2

INVENTOR.
JOSEPH A. ACKERMANN
BY Golrick & Golrick
Atty's.

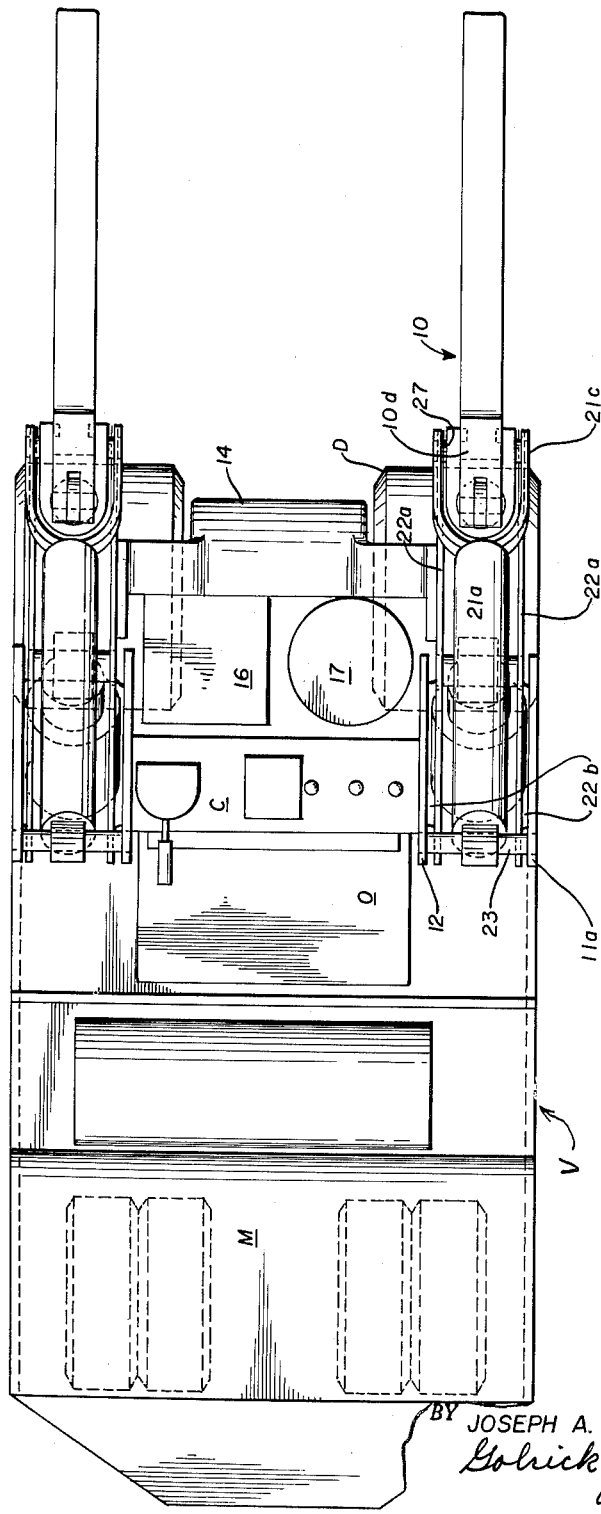

Jan. 23, 1962  J. A. ACKERMANN  3,018,011
INDUSTRIAL TRUCK
Filed Aug. 29, 1957  4 Sheets-Sheet 4

INVENTOR.
JOSEPH A. ACKERMANN
BY Golrick & Golrick
Attys.

United States Patent Office 3,018,011
Patented Jan. 23, 1962

3,018,011
INDUSTRIAL TRUCK
Joseph A. Ackermann, Cleveland Heights, Ohio, assignor to The Elwell-Parker Electric Company, Cleveland, Ohio, a corporation of Ohio
Filed Aug. 29, 1957, Ser. No. 681,009
5 Claims. (Cl. 214—140)

The present invention is concerned generally with an industrial truck, more particularly with industrial trucks of the tier lift type and specifically with an industrial truck having a novel type of lift mechanism.

In tier lift type industrial trucks and particularly in those trucks intended for transport and manipulation of relatively heavy loads, somewhat massive load lift structure is built onto one end of the vehicle. Such structure generally involves an elevator structure including rugged upright members mounted at one end of the truck chassis as a frame for a load engaging carriage vertically movable with rspect thereto, either directly upon the named frame members or upon an intermediate elevatable frame section; while the space between the fixed frame members is in greater part occupied by chain or cable connections suitably reeved to apply a lifting force to the load carriage and usually also by hydraulic cylinder elements providing motive power for lifting the carriage and, where present, the elevatable frame section.

In such structures of the prior art, the operator's view of the field of load manipulation by the movable load carriage is usually in great part obstructed by the intervening elevator structures above noted. This, of course, is undesirable from safety consideration during vehicular movements of the truck and also during load manipulation and engagement even with the vehicle stationary. Further for a given range of vertical load shift such prior structures have involved overall vehicle lengths and at times minimum vehicle clearance heights that desirably would be decreased by even as much as a few inches, since such dimensions affect the maneuverability by way of turning radius and at times limit the use of the truck because of overhead clearance in certain places.

By the present invention, a novel type of lift truck structure affords to the operator a vastly improved view of the fields of load manipulation and of the vehicle path. Also some relative overall shortening of the truck structure is achieved by virtue of the new lift mechanism, thereby increasing its maneuverability in close aisle storage regions or in such environments as railroad cars. Further the overall height of the truck is decreased in comparison with prior structures for the load lift attainable. These objects of increased visibility, lower truck height, somewhat shorter overall truck length with increased maneuverability and, for a given truck weight, increased stability under loaded condition are achieved by the use of a parallelogram-type linkage mechanism mounted on one end of the truck and carrying load engaging means.

In the principal specific embodiment of the invention hereinafter disclosed, structurally independent, simultaneously hydraulically operated parallelogram linkage mechanisms are mounted on opposite sides of one end of the truck in front of the operator's station leaving a wide space between such mechanisms, which with the low fixed height thereof affords excellent visibility to the operator. Moreover the parallelogram linkage structure is such that a load carried, say on forks as the specific load engaging means, may be tilted according to usual practice during load transport for load security. Also initial lift of the load for running clearance is achieved without actuation or operation of the pantograph or parallelogram mechanism as a whole.

In addition to the aforementioned objects and advantages, others will appear in the following description of one embodiment of the invention and drawings thereof, wherein:

FIG. 3 is a plan view of the truck;

Figure 2:
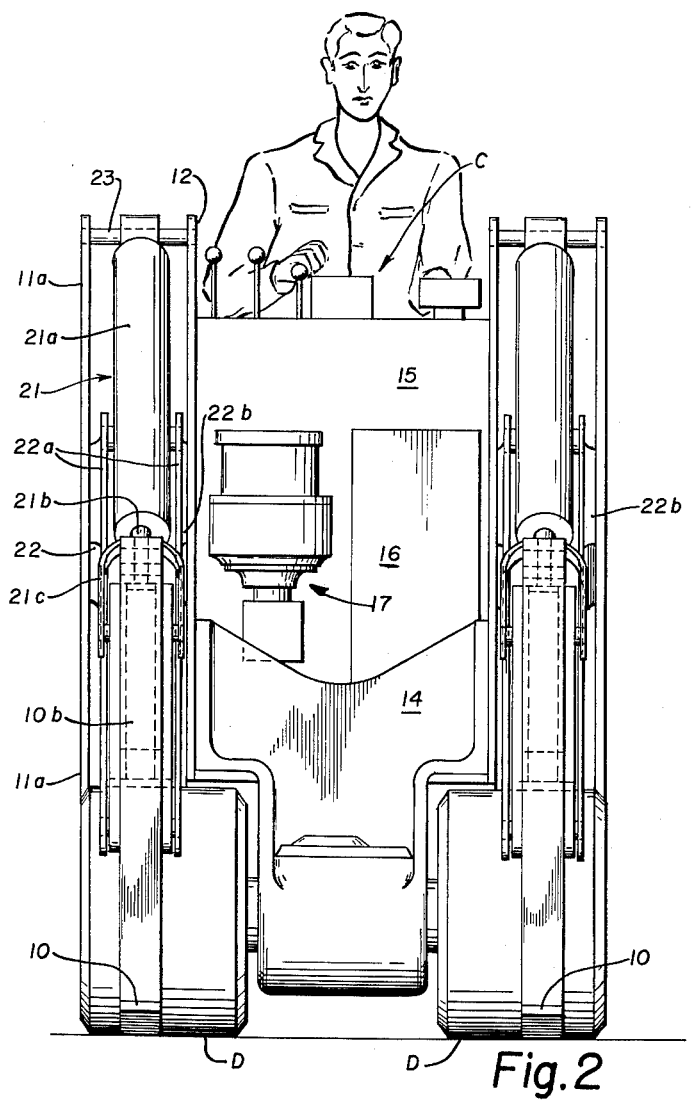
FIG. 2 is a front view of the truck.

The general vehicle structure V of the truck, shown in the drawings as embodying the invention, is a type well known in the art, with front drive wheels D, rear steering wheels S, a drive motor M, and operator's station O, before which, in position for convenient access to an operator standing in station O (as best seen in FIGS. 2 and 3) are mounted controls C for the various vehicle mechanism and for the fork lift mechanism designated by the general reference character L. Any suitable steering system may be used; and the motor M, here shown in position as would be convenient for an internal combustion engine, can of course be any suitable drive means such as an electric motor placed according to usual design considerations for this type of vehicle. A counterweight W for the rated load and lift mechanism is located at the rear of the vehicle; and where the truck is battery driven, the batteries may be located toward the rear of the truck as at least part of an effective counterweight mass.

In the particular form of the invention appearing in the drawings the lift mechanism L comprises two identical pantograph-type or more correctly parallelogram-type linkage mechanisms symmetrically located on opposite sides of the forward part of the truck, structurally independent but simultaneously operated to move the forks 10 in unison. Hence only one such mechanism will be described hereinafter.

Forward of the operator's station integral vertical extensions 11a of the truck chassis steel plate side skirts 11a cooperate with respective inwardly spaced parallel plates 12 to provide means whereby the linkage mechanisms are mounted on the truck chassis, as well as fixed structural elements of such mechanisms. The plates 12 are welded or otherwise rigidly secured to side flanges of a housing 14 for the drive wheel axle bearings and drive gearing. A vertical cross plate 15 welded between the plates 12 in rearwardly spaced relation to housing 14 provides space wherein are mounted a hydraulic fluid reservoir tank 16 and an electric motor driven hydraulic pump unit 17. At the top of plate 15, a panel 18 extending between the plates 12 provides a mounting for the controls C.

In each of the parallelogram (see FIGS. 1, 2, 3 and 5) mechanisms there is a pair of generally parallel arms, the upper arm 21 and lower arm 22, each pivotally secured to swing vertically between plate 11a and plate 12 by vertically spaced pivot pins 23, 24 through the back ends of the respective arms. A compound, that is telescoping, type hydraulic cylinder unit or ram 32, single acting, serves as the primary lift motor or main actuator for the parallel linkage mechanism.

Figure 6:
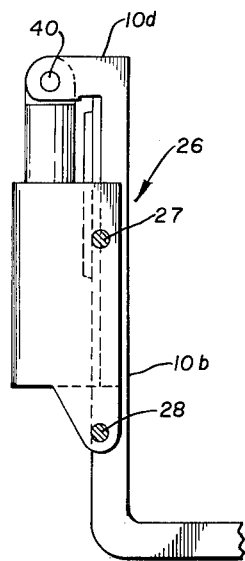
FIG. 6 is a side elevation view of an initial lift cylinder unit and fork assembly.

An initial fork lift cylinder unit 26 (see FIGS. 4 and 6) includes a pair of pivot means 27, 28 with vertical spacing equal to that of 23, 24 for pivotal mounting of the forward end of the arms 21, 22 respectively. However the linkage between truck chassis and cylinder unit 26 differs from the usual parallelogram linkage of a pantograph since the upper arm 21 is a simple double-acting hydraulic cylinder unit or ram with the end of the cylinder 21a pivotally connected by pin 23 between plate 11, 12 and with the piston rod 21b carrying a U-shaped yoke 21c spanning the cylinder member 26a of unit 26 and engaged with corresponding trunnions carried by cylinder 26. The arm 21 accordingly may be extended or contracted in length to tilt the unit 26 either forwardly or backwardly out of the vertical for corresponding tilt of the fork 10 and load engaged therewith, as is desirable and usual in fork lift trucks.

The lower arm 22 is formed by a pair of like elongated plate or bar elements 22a, 22a rigidly secured together in spaced parallel relation. The hydraulic unit 32 includes a main outer cylinder 32a and a piston 32b pivotally connected respectively by a lower pivot shaft 34 to the truck chassis and by an upper pivot shaft 35 to the middle region of the lower arm 22. Rearward of drive wheel D, free space is provided inward of the forward portion of skirt 11, which with the free space between plates 11a and 12 accommodates the unit 32 in its swinging motion as it extends to lift the parallel arms. The lower pivot shaft 34 is thus conveniently supported by skirt 11 and some element spaced inwardly therefrom, for example, fixed on the lower part of plate 12 or a chassis frame member. The pivot shaft 35 is passed through the space members 22a, 22a and the end of piston member 32a located therebetween.

By the use of a compound unit 32, that is, a unit with at least one tubular cylinder coaxially disposed between and sealed to both main cylinder 32a and piston 32b, a minimum contracted length of the unit is achieved for the required total extension. A single acting cylinder, in which fluid hydraulic pressure serves to extend the same and lift the load, is sufficient for the purpose, since the weight of the mechanism with or without load serves to cause contraction and lowering of the system when hydraulic lifting pressure is released and the unit permitted to exhaust.

The initial lift cylinder unit or ram structure 26 which also provides the mounting of fork L on the mechanism, includes the cylinder member 26a, the piston member 26b, and a vertical slideway portion 30 to which the cylinder member 26a is rigidly secured with axis in parallel relation to the length of slideway formation 30a. The trunnion sets or pivot means 27, 28 are secured in rigidly spaced parallel relation on ram structure, which then serves as a link member opposite and normally generally parallel (except on load tilting) to that portion of plates 11a, 12 incorporating pivots 23, 24 as a fixed element of the parallelogram linkage.

Figure 4:
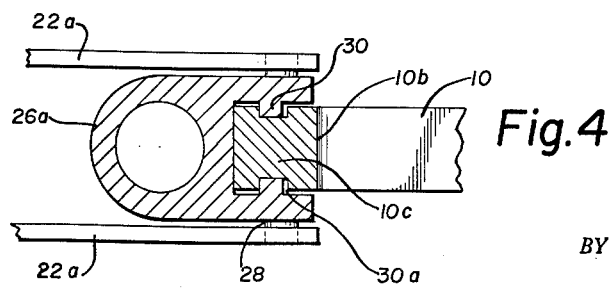
FIG. 4 is a detail of the initial fork lift cylinder structure.

The fork 10 is of an L-shape with a forwardly projecting tine for pallet or load engagement and a vertical leg 10b, the back portion of which is formed (as seen in FIG. 4) as a slide 10c of general T-shape corresponding to the T-slot slideway formation 30a. A rearward right angle extension 10d from the top of leg 10b is slotted to receive the upper end of piston rod 26b held by pivot 40. The unit 26 is again a telescoping single acting type unit as described for 32 to secure minimum length for the required stroke or initial lift of fork tines 10a.

A bearing or spacer plate 22b secured to the outer side plate of each arm 22 adjacent extension 11a may be used to minimize side sway toward the side of the truck in each such mechanism. Since the load supported jointly on the forks 10 is in effect a cross member tying the front free ends of the individual parallelogram devices together into one mechanism, inclination of one device toward the inside of the truck is inhibited by the simultaneous bearing of the arm 22 of the other device, through its spacer 22b, against the adjacent extension 11a.

Figure 7:
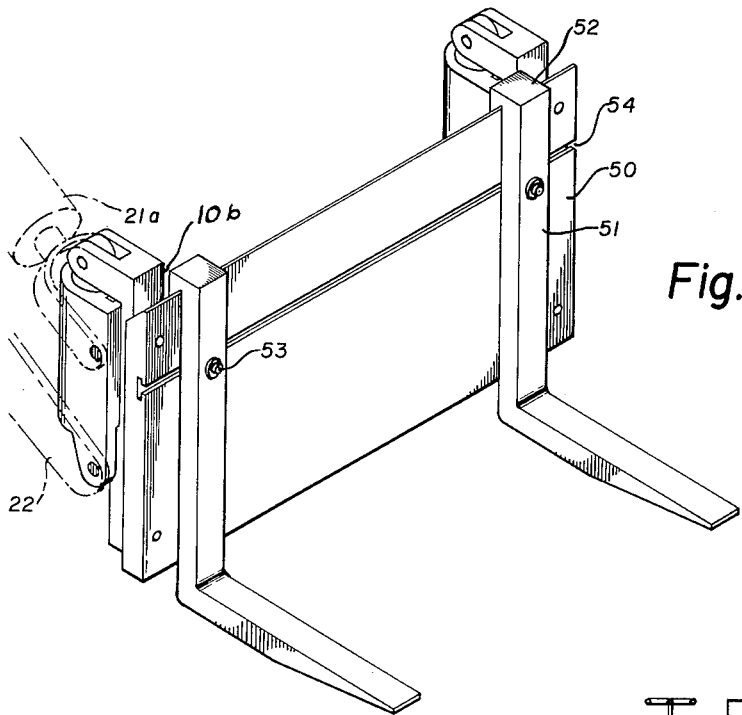
FIG. 7 is a detail showing a modification of the fork connection to the initial lift cylinders.

In FIG. 7 there appears a modification of the manner of attaching the forks to the parallelogram devices, which in this case are no longer structurally independent, since a cross plate 50 now is fixed to and movably carried by the slide elements 10b previously described. In effect the tines of the forks in FIGS. 1–4 are omitted for accommodation of the vertical cross plate; the upper edge of the latter is rearwardly downwardly beveled; and modified forks 51, with correspondingly hooked top portions 52 hung on the beveled top edge, are disposed on the front face of the cross plate in transversely adjustable spaced relation. The modified forks may be held in selected relative position by any suitable means; for example by clamping T-bolts 53 engaged in a slot 54 across the plate 50.

Figure 8:
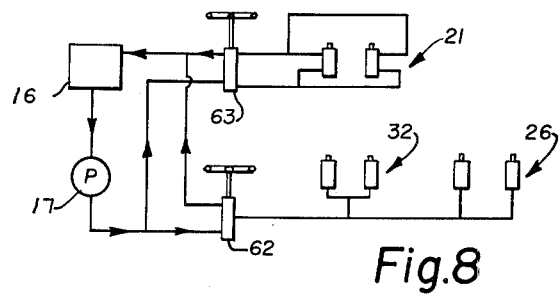
FIG. 8 is a schematic hydraulic circuit in simplified form for operation of the lift mechanism.
Figure 5:
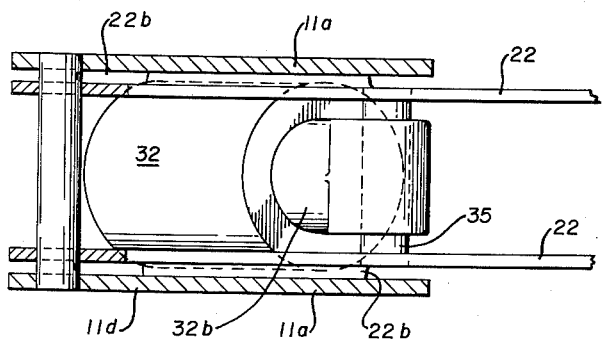
FIG. 5 is a sectional view taken at the line 5—5 in FIG. 1.

Omitted from the drawings but within the knowledge of one skilled in the art are the specific hydraulic control lines for operation of the lift mechanism. However a schematic diagram, simplified, of one possible circuit is shown in FIG. 8. Obviously hydraulic pressure is to be applied to and released from the cylinders 32 simultaneously so that both mechanisms will be extended or raised to the extreme elevated position shown by the dot and dash line of FIG. 1. Thus a single hydraulic line branching through a hydraulic flow divider to the two cylinders 32 is controlled by a single valve 62, which at a neutral setting blocks flow relative to the cylinders to maintain a given setting of the mechanisms; at one operating setting connects the pump unit 17 drawing liquid from tank 16 to the cylinders 32 to raise the pantograph; and at the other operative setting connects the cylinders to tank 16 to permit the same to exhaust and lower the mechanisms.

In like fashion the tilt function available by extension or contraction of the cylinder units in the upper arms 21 is attained by simultaneously extending or simultaneously retracting such arms; and thus a common control valve 63 again is used. Valve 63 controls two lines, one having a flow divider connected to the upper ends of the respective cylinder units, and the second line having a flow divider connected to the lower ends of the respective units in the arms 21. The flow control valve 63 here at one setting directs fluid from pump 17 or other pressurized source to the upper ends of such cylinders and connects the line from the lower ends of such cylinders to a sump tank 16 or reservoir exhaust line; upon reversal of the valve to an opposite operating setting these connections are reversed; and at a neutral or non-operating point flow is blocked relative to such cylinders to hold the load engaging devices at a given tilt.

The single acting cylinder units 26 again are operated through a system similar to that used for the cylinders 32, in the sense that a control valve at one setting applies pressure to the cylinders to cause an initial lift of the load by extension of units 26; at an opposite operating setting permits the cylinders to exhaust for lowering; and at a non-operating position blocks flow from the cylinder so that a particular load disposition is maintained.

It may be here noted that one control valve may be used for both cylinders 32 and cylinders 26 by connecting the flow dividers for these sets of units to a common valve controlled line. Thus upon application of pressure in the controlled line, the initial lift is first achieved, and with continuing application of pressure and full extension of the units 26, the units 32 then begin to extend to raise the load further. A reverse operation results upon setting the valve to lowering position, permitting the controlled line to exhaust; or a given disposition is held by setting the valve to non-operating position. The initial lift range is sufficient for running clearance during load transport by the vehicle from one location to another. To insure full range of vertical swing, the variable length arms 21 are set to the same length as the invariant arms by operation of cylinders 21a.

Figure 1:
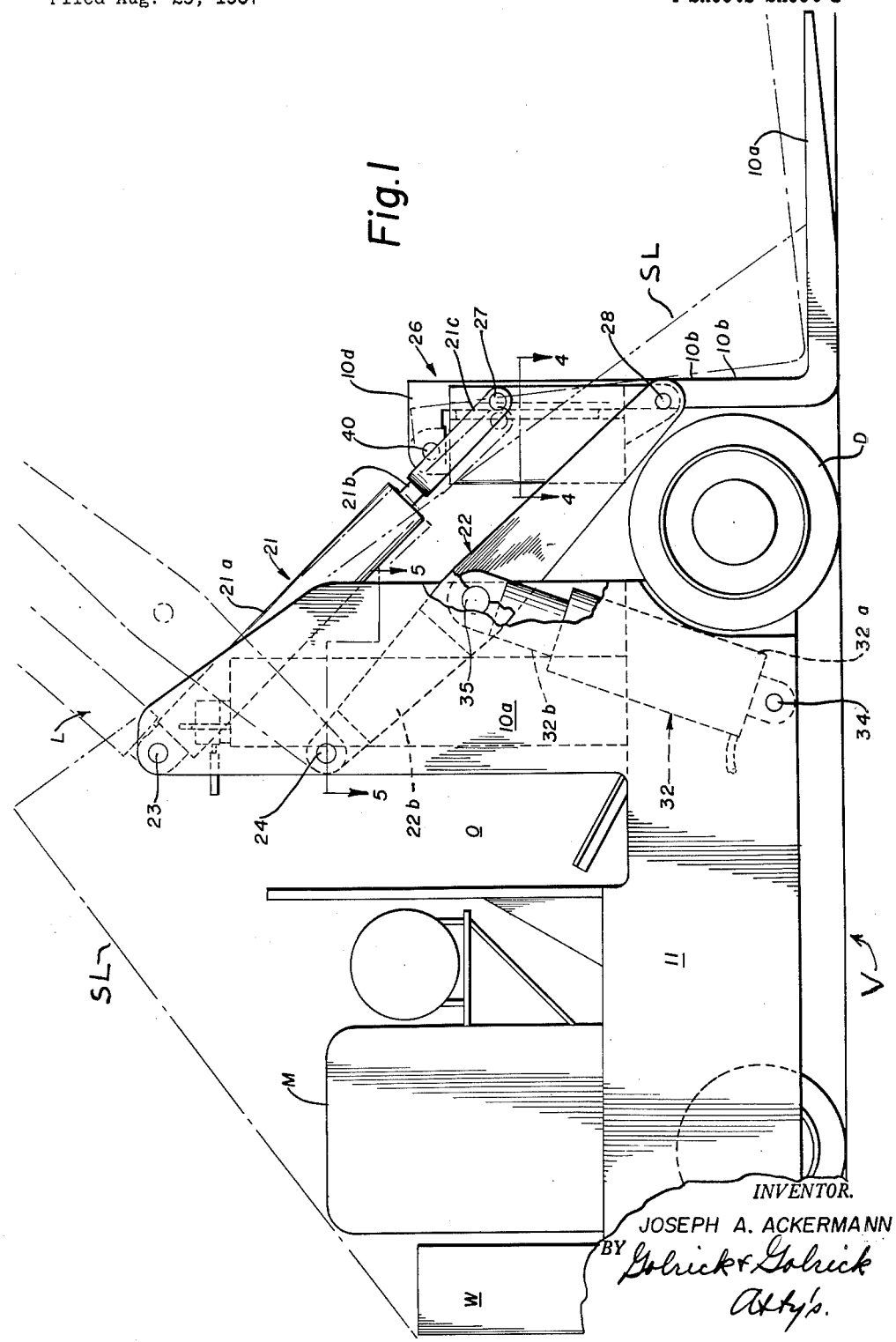
FIG. 1 is a side view of a truck embodying the present invention.

It is readily observed from the drawings that the load engaging forks are, and therefore the load will be quite close to the front wheels, furthering stability of the loaded truck and keeping the overall length short; and also that excellent visibility is provided for the operator as indicated by the sight lines SL in FIG. 1.

I claim:

1. An industrial truck comprising: a dirigible vehicle chassis including front and rear paired wheels and an operator's station spaced rearwardly of and proximate to the front wheels; a pair of upright structures located between the said station and front wheels and projecting vertically above said chassis, two like parallelogram-type linkages mounted on the respective upright structures and projecting forwardly therefrom in spaced parallel relation; each linkage including a rigid front link element and generally parallel elongated upper and lower arms with rear ends and front ends connected respectively to the top portion of a corresponding upright structure on the truck and to the rigid front link element by respective like spaced sets of vertically spaced transverse pivots, the two linkages being adapted to swing in respective parallel vertical planes; said linkages being structurally independent and said upright structures being mutually, laterally spaced to afford an operator in said station clear unimpeded vision therebetween forward and also downward to the vehicle supporting area immediately in front of the truck; load engaging means supported on the said rigid front link elements; main power actuators for the linkages including hydraulic cylinder units each operatively disposed between the truck chassis and the lower arm of a corresponding linkage said cylinder units being simultaneously operable to swing the linkages in unison as a single means for raising or lowering a load, said load engaging means being connected to said front link elements by vertically operated hydraulic cylinder means whereby the load engaging means may be lifted vertically while the linkages remain stationary.

2. In an industrial tier lift truck, forwardly operating load lift means comprising a pair of parallelogram-type linkage each including operatively parallel elongated upper and lower arms, upright mast elements rising from the sides of the truck body at each side of the forward end of the truck, the two arms of each linkage being pivotally connected respectively to the upright mast elements and the forward ends of the arms being pivotally connected to rigid link elements, the arms and the rigid link elements being adapted to swing vertically in respective parallel planes, the arms of one linkage being structurally independent of those in the other linkage said rigid link elements being in the form of hydraulic ram structures having vertically extending slideways; and load engaging means comprising slide elements operable in the slideways of the ram structures and actuated by rams of the ram structures, and load engaging tines carried on the slide elements.

3. In an industrial tier lift truck, forwardly operating load lift means comprising a pair of independent parallelogram-type linkages each including two operatively parallel elongated upper and lower arms, one of the arms being varaible in length and the length of the other arm being constant, upright mast structures rising from the sides of the truck body at each side of the forward end of the truck, the two arms of each linkage being pivotally connected respectively to corresponding upright mast structures and the forward ends of the arms being pivotally connected to a rigid link element, the arms and the rigid link elements being adapted to swing vertically, compound hydraulic rams for swinging the linkages vertically, said rigid link elements being in the form of hydraulic rams, load engaging elements simultaneously operable by the last said rams vertically relative to the rigid link elements, and hydraulic mechanisms for varying the length of the upper arms in unison, whereby the load engaging elements may be tilted for safe retention of a load during vehicle travel.

4. An industrial truck as described in claim 1, wherein in each linkage one of said arms is variable in length and includes hydraulic cylinder unit means for varying the length and holding a selected length, the other arm being rigid; the cylinder unit means of the two linkages being operable in unison to tilt the load engaging means backwardly for safe load detention during vehicle travel.

5. An industrial truck comprising: a dirigible vehicle chassis including front and rear paired wheels and an operator's station spaced rearwardly of but proximate to the front wheels; a pair of upright structures located between the said station and front wheels and projecting vertically above said chassis; two like parallelogram-type linkages mounted on the respective upright structures and projecting forwardly therefrom in spaced parallel relation; each linkage including a rigid front link element and generally parallel elongated upper and lower arms with rear ends and front ends connected respectively to the top portion of a corresponding upright structure on the truck and to the rigid front link element by respective sets of vertically spaced transverse pivots, the two linkages being adapted to swing in parallel respective vertical planes; load engaging means supported on the front of said rigid front link elements; respective compound hydraulic ram actuators for the linkages each operatively disposed between the truck chassis and the lower arm of a corresponding linkage and adapted to raise and lower said load engaging means forward of the said station between a position adjacent the truck supporting surface and a position above the top portions of the upright structures; said upright structures being mutually and laterally spaced relative to said station and the space between said linkages rearwardly of said front links being free of transverse structural elements thereby to afford an operator in said station clear unimpeded vision between said upright structures and said linkages forwardly and also downwardly to the vehicle supporting area immediately before the truck; said load engaging means comprising a transverse base member and tine elements carried by the base member in horizontally adjustably spaced relation, said base member being connected to said front link elements by vertically operated hydraulic cylinder means whereby the load engaging means may be lifted vertically while the linkages remain stationary.

References Cited in the file of this patent

UNITED STATES PATENTS

| | | |
|---|---|---|
| 941,426 | Loudon | Nov. 30, 1909 |
| 2,338,361 | Shinn | Jan. 4, 1944 |
| 2,348,899 | Guignard | May 16, 1944 |
| 2,366,378 | Barrett | Jan. 2, 1945 |
| 2,623,654 | Dunham | Dec. 30, 1952 |
| 2,646,182 | Maas | July 21, 1953 |
| 2,820,555 | Lessmann | Jan. 21, 1958 |
| 2,835,397 | Wagner | May 20, 1958 |
| 2,897,985 | Carlson et al. | Aug. 4, 1959 |